(12) United States Patent
Nambu

(10) Patent No.: US 10,598,117 B2
(45) Date of Patent: Mar. 24, 2020

(54) INJECTOR DRIVING DEVICE

(71) Applicant: DENSO CORPORATION, Kariya, Aichi-pref. (JP)

(72) Inventor: Hiroki Nambu, Kariya (JP)

(73) Assignee: DENSO CORPORATION, Kariya (JP)

( * ) Notice: Subject to any disclaimer, the term of this patent is extended or adjusted under 35 U.S.C. 154(b) by 19 days.

(21) Appl. No.: 16/131,461

(22) Filed: Sep. 14, 2018

(65) Prior Publication Data

US 2019/0093589 A1 Mar. 28, 2019

(30) Foreign Application Priority Data

Sep. 27, 2017 (JP) .................... 2017-186692

(51) Int. Cl.
| | | |
|---|---|---|
| *F02D 41/00* | (2006.01) | |
| *F02D 41/30* | (2006.01) | |
| *H02M 3/155* | (2006.01) | |
| *H02M 3/156* | (2006.01) | |
| *F02D 41/20* | (2006.01) | |
| *F02M 51/00* | (2006.01) | |
| *H02M 1/36* | (2007.01) | |
| *H02M 1/00* | (2006.01) | |

(52) U.S. Cl.
CPC ......... *F02D 41/3005* (2013.01); *F02D 41/20* (2013.01); *H02M 3/155* (2013.01); *H02M 3/156* (2013.01); *F02D 2041/2006* (2013.01); *F02D 2041/2051* (2013.01); *F02M 51/00* (2013.01); *H02M 1/36* (2013.01); *H02M 2001/0025* (2013.01)

(58) Field of Classification Search
CPC ............ F02D 41/20; F02D 2041/2006; F02D 2041/2051; F02M 51/00
See application file for complete search history.

(56) References Cited

U.S. PATENT DOCUMENTS

| | | | |
|---|---|---|---|
| 10,267,253 B2* | 4/2019 | Okonogi | F02D 41/22 |
| 10,450,995 B2* | 10/2019 | Kimura | F02D 41/402 |
| 2004/0207370 A1 | 10/2004 | Suzuki | |
| 2014/0316679 A1* | 10/2014 | Nishida | F02D 41/20 |
| | | | 701/104 |
| 2017/0335789 A1* | 11/2017 | Kiuchi | F02D 41/062 |

FOREIGN PATENT DOCUMENTS

JP 2016-160862 A 9/2016

* cited by examiner

*Primary Examiner* — Thomas N Moulis
(74) *Attorney, Agent, or Firm* — Posz Law Group, PLC

(57) ABSTRACT

An injector driving device includes a control circuit of a booster circuit that charges a capacitor by repeatedly switching a booster switch ON/OFF during a voltage boost control to cause a reverse voltage in a coil, and stops the voltage boost control upon determining that a capacitor voltage has reached a corrected target value. The control circuit detects a peak value of the capacitor voltage during an OFF period of the boost switch. The control circuit also detects a capacitor voltage as an ON value during the subsequent ON period of the booster switch. A difference between the peak voltage and the ON value of the capacitor is calculated, and a post-correction target value is set by adding the difference to a reference value of a target value.

6 Claims, 7 Drawing Sheets

INJECTOR DRIVING DEVICE

CROSS REFERENCE TO RELATED APPLICATION

The present application is based on and claims the benefit of priority of Japanese Patent Application No. 2017-186692, filed on Sep. 27, 2017, the disclosure of which is incorporated herein by reference.

TECHNICAL FIELD

The present disclosure generally relates to an injector driving device that has a booster circuit for driving an injector.

BACKGROUND INFORMATION

The injector driving device for driving an injector, e.g., for controlling an injection of fuel into an engine, has a booster circuit in order to generate a voltage higher than a vehicle battery or other power source voltage for charging a capacitor. In the injector driving device, a large electric current is discharged from the capacitor and flows to an electromagnetic coil of the injector (e.g., a solenoid for a valve-opening operation) to drive the injector, that is, to control the injection of fuel from the injector into the engine. Such a driving device can be used to improve the valve opening responsiveness in an injector.

The booster circuit in the injector driving device is provided with (i) a coil to which a power source voltage is supplied via a first terminal, and (ii) a switching element that opens and closes a path between a second terminal of the coil and a ground potential. The coil in the booster circuit may be designated as a booster coil. The switching element in the booster circuit switches ON and OFF repeatedly to charge the capacitor. A controller for controlling the switching of the switching element stops the switching upon determining that a charge level of the capacitor, or more specifically, a voltage at a terminal of the capacitor (e.g., capacitor voltage), has reached a target value, and the switching element is kept in the OFF state.

In the booster circuit, a reverse voltage generated in the booster coil causes a large electric current to flow to the capacitor when the switching element is switched OFF. Thus, the capacitor voltage when the switching element is switched OFF momentarily rises due to an equivalent series resistance (ESR) of the capacitor. Therefore, even when the capacitor voltage has not yet stabilized to stay at the target value, the capacitor voltage may be inaccurately determined to already be at the target value, and the switching of the switching element may then be stopped. In other words, such inaccuracies may deteriorate the accuracy of the capacitor voltage control.

To resolve such a problem, Japanese Patent No. 2016-160862 ("patent document 1") discloses a method for gradually switching the switching element in the booster circuit from ON to OFF, to prevent a steep rise of the capacitor voltage by controlling the current flow in the capacitor to rise gradually.

The technique disclosed in patent document 1 lowers a switching speed of the switching element, and thereby increases a switching loss and generates heat in the switching element. The technique in patent document 1 also extends the ON periods and OFF periods between the switching times (e.g., increases the duration of the ON/OFF switching cycle) of the switching element as the capacitor voltage approaches the target value. As such, the time it takes for the capacitor voltage to reach the target value increases.

SUMMARY

It is an object of the present disclosure to improve the accuracy of achieving a capacitor target voltage in an injector driving device for driving an injector.

In an aspect of the present disclosure, an injector driving device may include a booster circuit to drive an injector. The booster circuit may include a coil having a first end and a second end, where a power source voltage is supplied to the coil via the first end. The booster circuit may further include a switching element having a first output terminal and a second output terminal. The first and second output terminals of the switching element may be connected in series between the second end of the coil and a reference potential, where the reference potential may be lower than the power source voltage, such that the first output terminal of the switching element is connected to the second end of the coil, and the second output terminal of the switching element is connected to the reference potential. The booster circuit may further include a diode having an anode and a cathode, the anode of the diode connected between the second end of the coil and the first output terminal of the switching element. The booster circuit may further include a capacitor having a positive terminal and a negative terminal, the capacitor connected in series between the cathode of the diode and the reference potential, where the positive terminal of the capacitor may be connected to the cathode of the diode and the negative terminal of the capacitor may be connected to the reference potential.

The injector driving device of the present disclosure may further include both a controller and a corrector.

The controller may perform a voltage boost control to charge the capacitor by repeatedly switching the switching element ON and OFF to cause a reverse voltage in the coil. The controller may be further configured to stop the voltage boost control upon determining that a capacitor voltage at the positive terminal of the capacitor has reached a corrected target value that is greater than the power source voltage.

The corrector may be configured to detect a physical value that is correlated with an equivalent-series-resistance (ESR) value of the capacitor, and to correct the target value to the corrected target value that may become greater in value when the detected physical value increases.

According to the configuration described above, when the ESR value of the capacitor is large and the capacitor voltage at an OFF switch time of the switching element has a greater peak value, the target value is corrected to a corrected target value that is greater in value than the target value.

In such manner, inaccuracies caused by the capacitor voltage not yet stably reaching the target value can be limited and/or prevented. That is, misrepresentations of a capacitor voltage reaching a target value, where in fact, the capacitor voltage has not yet stably reached the target value are limited and/or prevented, and the premature switching of the switching element to the OFF state is limited and/or prevented. The target value described above may be a pre-correction target value, e.g., a value of the target value before a correction by the corrector. Therefore, by comparing the capacitor voltage to a corrected target voltage, the accuracy of achieving the target capacitor voltage may be improved without controlling the switching speed of the switching element.

BRIEF DESCRIPTION OF THE DRAWINGS

Objects, features, and advantages of the present disclosure become more apparent from the following detailed description made with reference to the accompanying drawings, in which.

DETAILED DESCRIPTION

Hereafter, embodiments of this disclosure are described, with reference to the drawings.

1. First Embodiment

1-1. Configuration

Figure 1:
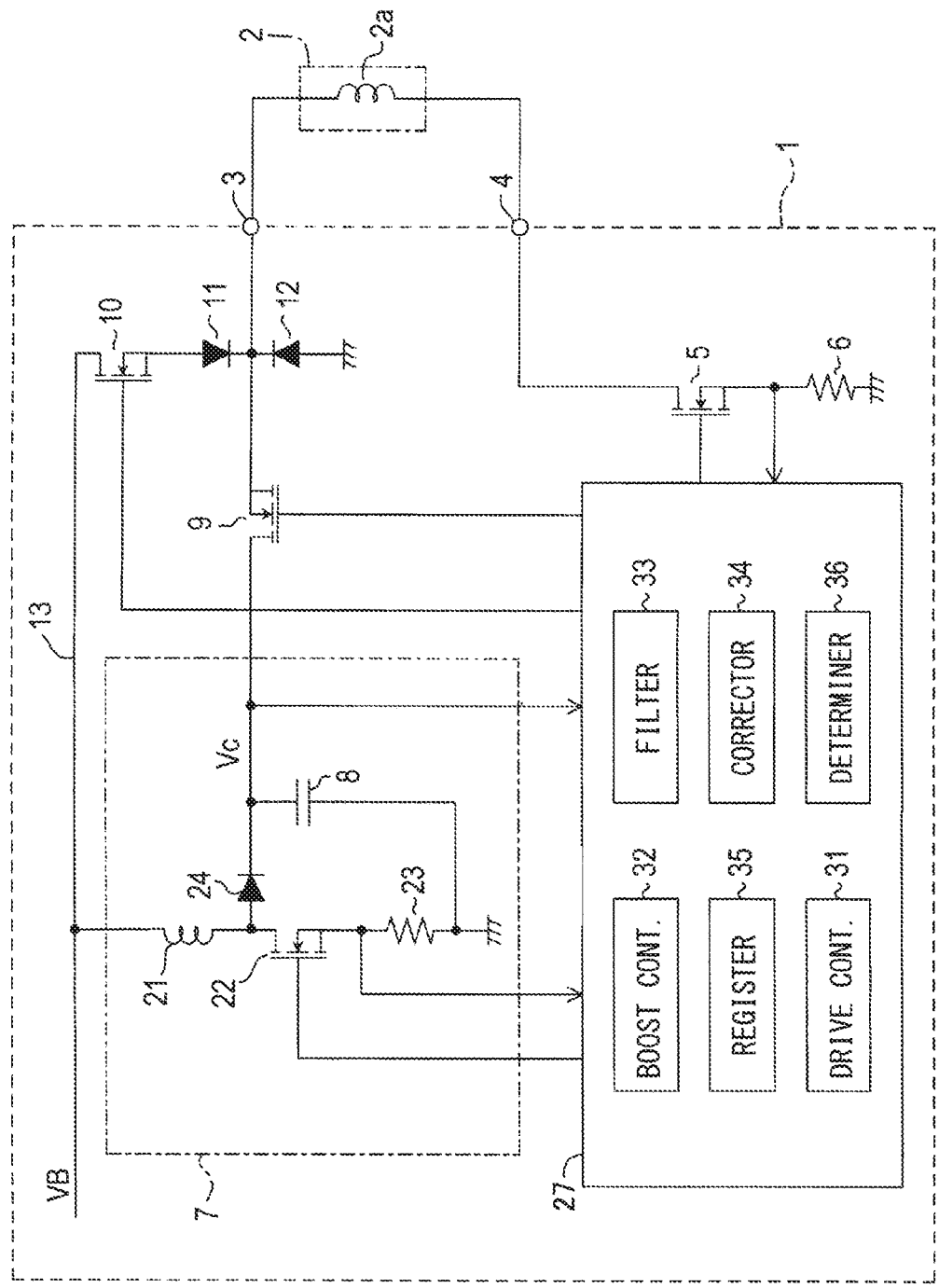
FIG. 1 is a block diagram of an injector driving device in a first embodiment of the present disclosure.

An injector driving device (i.e., a "driver") 1 shown in FIG. 1 drives an injector 2 to inject fuel into a cylinder of an internal combustion engine in a vehicle. The driver 1 may be used to drive a plurality of injectors 2 injecting fuel into a plurality of cylinders in an internal combustion engine. Though FIG. 1 illustrates only one injector 2 as an example and for ease of understanding the description, it should be noted that a plurality of injectors 2 may be connected to the driver 1. The following paragraphs describe the drive operation of the injector 2. The injector 2 is provided with a coil 2a for valve opening actions. When the coil 2a receives a power supply, a valve body moves to a valve opening position, and injection of fuel is performed. In the present embodiment, a switching element used as a switch to be turned ON and OFF is a MOSFET. However, the switching element may also be of other types, e.g., a bipolar transistor, or the like. Both "switching" ON/OFF and "turning" ON/OFF may be used to describe the switching of a switching element throughout the specification. Where a switching element is switched repeatedly between an ON/OFF (also OFF/ON) state, one switching cycle of the switching element may refer to an instance where the switching element is either switched ON to OFF and back to ON, or switched OFF to ON and back to OFF. That is, a cycle where one period of the switch is in the ON state and one period of the switch is in the OFF state, as described in additional detail below.

As shown in FIG. 1, the driver 1 includes a terminal 3 and a terminal 4. An upstream end of the coil 2a is connected to the terminal 3 and a downstream end of the coil 2a is connected to the terminal 4. The driver further includes a downstream switch 5 and a current sensing resistor 6, which are connected in series between the terminal 4 and a ground/reference potential.

In instances where a plurality of injectors 2 are connected to the driver 1, one end of each of the plurality of coils 2a is connected to one terminal 3. That is, in instances where there are a plurality of injectors 2, there may be only one terminal 3 to which the plurality of coils 2a are connected. On the other hand, a terminal 4 and a downstream switch 5 may be connected to each of the many injectors 2. That is, where there are a plurality of injectors 2 connected to the driver 1, one end of each of the plurality of coils 2a may be connected to its own terminal 4 with its own downstream switch 5. The downstream switch 5 may also be designated as a cylinder selection switch, since the downstream switch 5 is a switch for selecting the injector 2 to be driven by the driver 1.

The driver 1 further includes a booster circuit 7 with a capacitor 8 to boost a power source voltage VB, a discharge switch 9 to control the discharge of electricity from the capacitor 8 to the coil 2a, a constant current switch 10 to provide a constant current flow to the coil 2a from the power source voltage VB, and the diodes 11 and 12. In the present embodiment, the power source voltage VB is a battery voltage of an in-vehicle battery.

The discharge switch 9 is disposed at a position between a positive terminal of the capacitor 8 and the terminal 3. The constant current switch 10 is disposed at a position between a power source line 13 supplying the power source voltage VB and an anode of the diode 11. A cathode of the diode 11 is connected to the terminal 3. A cathode of the diode 12 is also connected to the terminal 3. An anode of the diode 12 is connected to the ground/reference potential.

When the downstream switch 5 and the discharge switch 9 turn ON, electricity is discharged from the capacitor 8 to the coil 2a. A constant current flows to the coil 2a by turning ON the downstream switch 5 and repeatedly switching the constant current switch 10 ON and OFF. The diode 11 blocks the current flow from the capacitor 8 toward the constant current switch 10. The diode 12 controls the flow of an electric current back to the coil 2a when (i) the discharge switch 9 is turned from ON to OFF, or (ii) the constant current switch 10 is turned from ON to OFF, where the downstream switch 5 is in an ON state. The end of the current sensing resistor 6 opposite to the ground potential side has a voltage, which is generated proportionally to the electric current flowing in the coil 2a.

In addition to the above-described capacitor 8, the booster circuit 7 may also include a voltage boost coil 21, a voltage boost switch 22, a current sensing resistor 23 for detecting an electric current flowing in the voltage boost coil 21, and a diode 24 for blocking a reverse current.

The voltage boost coil 21 has two ends with a first end connected to the power source line 13. As such, the power source voltage VB is supplied to the first end of the voltage boost coil 21.

The voltage boost switch 22 may be connected in series between a second end of the voltage boost coil 21 and the ground potential. That is, more specifically, the voltage boost switch 22 may have two output terminals, with a first output terminal connected to the second end of the voltage boost coil 21 and the second output terminal connected to the reference potential, such that second end of the voltage boost coil 21, the two output terminals of the voltage boost switch 22, and the reference potential (e.g., ground) are connected in series. In this example, the current sensing resistor 23 is connected at a position between the second output terminal of the voltage boost switch 22 (e.g., the source terminal) and the ground potential. The voltage boost switch 22 corresponds to a switching element. The ground potential corresponds to a reference potential.

An anode of the diode 24 is connected to the second end of the voltage boost coil 21 and the first output terminal of the voltage boost switch 22 (e.g., the drain terminal). The capacitor 8 is connected in series between a cathode of the diode 24 and the ground potential. More specifically, a positive terminal of the capacitor 8 is connected to the cathode of the diode 24 while the negative terminal of the capacitor 8 is connected to the reference potential.

In the booster circuit 7, when the voltage boost switch 22 is turned ON, an electric current flows from the power source line 13 to the voltage boost coil 21 and further to the voltage boost switch 22 and the current sensing resistor 23. Further, when the voltage boost switch 22 is turned from ON to OFF, the capacitor 8 is charged via the diode 24 with the counter- or back electromotive force (EMF) (e.g., reverse voltage) generated in the voltage boost coil 21. As used herein, counter-EMF or back-EMF generated in the voltage boost coil 21 may be referred to as a reverse voltage. The capacitor 8 is charged by repeatedly switching the voltage boost switch 22 ON and OFF, that is, every time the switch 22 is switched ON and OFF.

The driver 1 may also be equipped with a control circuit 27 that is configured to control each of the above-described switches 5, 9, 10, and 22. The control circuit 27 may include a drive controller 31 that controls the downstream switch 5, the discharge switch 9, and the constant current switch 10 for driving the injector 2. The control circuit 27 may also include a voltage boost controller 32 that controls the voltage boost switch 22. The control circuit 27 may also include a filter 33, a corrector 34, a register 35, and a determiner 36.

The control circuit 27 may be realized as a digital circuit or an analog circuit, including many logical circuits. The control circuit 27 may also be realized as a combination of the digital and analog circuits. In other words, the control circuit 27 may be realized as hardware components. That is, each of the drive controller 31, the voltage boost controller 32, the filter 33, the corrector 34, the register 35, and the determiner 36 may be realized by one or more hardware components such as, active and passive circuit elements, integrated circuits (e.g., chips), an application specific integrated circuit (ASIC), a field-programmable gate array (FPGA), input/output (I/O) circuitry, logic circuits, or other specialized circuit configurations configured to perform a function, process or method associated with the elements of the control circuit 27. For example, the drive controller 31 may be an ASIC configured to perform the processes associated with the drive controller 31. The register 35 may be, for example, an IC or other logic circuits. The determiner 36 may be, for example, an FPGA configured to perform the processes associated with the determiner 36. The processes performed by each of the drive controller 31, the voltage boost controller 32, the filter 33, the corrector 34, the register 35, and the determiner 36 are described in greater detail below.

The control circuit 27 and its elements 31-36 may also be realized as one or more microcomputers, with each microcomputer having, for example, a CPU, a semiconductor memory, and input/output (I/O) circuitry. The semiconductor memory may be referred to simply as "memory" and be, for example, a RAM, a ROM, and a flash memory. In such case, various functions of the control circuit 27 and its elements 31-36 may be realized when the CPU executes a program stored in a non-transitive, substantive storage medium, In this example, the above-mentioned memory corresponds to the non-transitive, substantive storage medium storing such program. A method corresponding to the program is performed by an execution of such program by the CPU. As such, when the control circuit 27 is realized as one or more microcomputers, the processes, functions, operations, and methods performed by each of the elements 31-36 may be realized by an execution of software, with the microcomputer configured to perform such processes. For example, as a microcomputer, the control circuit 27 may be configured to perform the processes associated with the drive controller 31, the voltage boost controller 32, the filter 33, the corrector 34, the register 35, and the determiner 36, all of which are described below in greater detail.

The drive controller 31 is configured to turn ON the downstream switch 5 during a period to drive the injector 2, that is, during an injector driving period. The drive controller 31 is further configured to turn ON the discharge switch 9 when the injector driving period begins, and turn OFF the discharge switch 9 when it is determined that the current flowing to the coil 2a from the capacitor 8 has reached a target peak value. The current flowing to the coil 2a is detected as a voltage generated in the current sensing resistor 6. The drive controller 31 is configured to turn the constant current switch 10 ON and OFF during the period from when the discharge switch 9 is turned OFF to the end of the injector driving period, to control the current flowing to the coil 2a at a predetermined constant value. The control circuit 27 receives an instruction of the injector driving period from an injection control section (not illustrated), that may be a microcomputer. The injection control section may be included in the driver 1, or may be included in another device such as a control device that is external to the driver 1.

A target value VT of a capacitor voltage Vc is stored in the register 35. The capacitor voltage Vc is a voltage of a terminal of the capacitor 8, that is, the voltage at the positive terminal of the capacitor. At the beginning of the voltage boost control, described in greater detail below, the reference value Vref of the target value VT is stored in the register 35 as the target value VT. The reference value Vref is a "pre-correction" target value VT, i.e., before being corrected. The target value VT in the register 35 is corrected using the reference value Vref by the corrector 34. As used herein, the target value VT may refer to both the pre-correction target value and the post-correction target value. The corrector 34 is described in greater detail below.

The filter 33 is a low-pass filter that receives the capacitor voltage Vc as an input. The control circuit 27 detects the value of the capacitor voltage Vc after the capacitor voltage first passes through the filter 33. The voltage boost controller 32 begins a voltage boost control, where the voltage boost switch 22 is repeatedly switched ON and OFF, when it is determined that the capacitor voltage Vc has fallen to be equal to or below a predetermined voltage boost start threshold VL. The voltage boost start threshold VL is higher than the power source voltage VB, but it is lower than the above-described reference value Vref.

The voltage boost controller 32 is configured to detect the current, that is, the voltage boost coil current, flowing in the voltage boost coil 21 by detecting the voltage generated in the current sensing resistor 23, when the voltage boost switch 22 is turned to ON. When the voltage boost controller 32 determines that the voltage boost coil current has increased to a predetermined turn-OFF threshold value, the voltage boost controller 32 controls the voltage boost switch 22 to turn from ON to OFF. After turning the voltage boost switch 22 OFF, after a predetermined amount of time elapses, the voltage boost controller is further configured to turn ON the voltage boost switch 22. Thus, the capacitor 8 is charged by repeatedly switching the voltage boost switch ON and OFF. When the voltage boost controller 32 determines that the capacitor voltage Vc has reached the target value VT, the voltage boost controller 32 stops the voltage boost control and maintains the voltage boost switch 22 in the OFF state. That is, the voltage boost controller 32 controls the voltage boost switch 22 to remain OFF when the capacitor voltage reaches the target value VT. The voltage boost controller 32 may be referred to herein simply as the controller 32.

The corrector 34 is configured to detect a difference ΔV between (i) a peak value Vp of the capacitor voltage Vc in the OFF period of the voltage boost switch 22 during the voltage boost control, and (ii) a switch-ON value Von of the capacitor voltage Vc in the subsequent ON period of the voltage boost switch 22 during the voltage boost control. The corrector 34 is further configured to correct the target value VT in the register 35 by using the detected difference ΔV. That is, the target value VT may be first stored in the register 35 and a subsequent corrected target value VT may be stored in the register 35.

The determiner 36 is configured to determine whether the capacitor voltage Vc has reached the predetermined correction start threshold value VS, after the voltage boost control begins. The correction start threshold value VS is a threshold for starting the correction of the target value VT. The correction start threshold value VS is higher than both the power source voltage VB and the voltage boost start threshold VL, but lower than the above-mentioned reference value Vref. The corrector 34 begins operating (e.g., begins performing the above-described functions), after the determiner 36 determines that the capacitor voltage Vc has reached the correction start threshold value VS.

1-2. Processing

Of the processes performed by the control circuit 27, the processes performed by the voltage boost controller 32, the corrector 34, and the determiner 36 are described with reference to FIG. 2. The process flow shown in FIG. 2 may be performed by the control circuit 27 alone, for example, when the control circuit 27 is realized by a microcomputer, or may be performed by the specific elements of the control circuit 27, when the controller 32, the corrector 34, and the determiner 36 are realized by hardware elements. The description of the following process flow includes both general processing performed by the control circuit 27 as a whole, and also specifies the specific element (e.g., the controller 32, the corrector 34, and the determiner 36) of the control circuit 27 that may perform the process.

Figure 2:
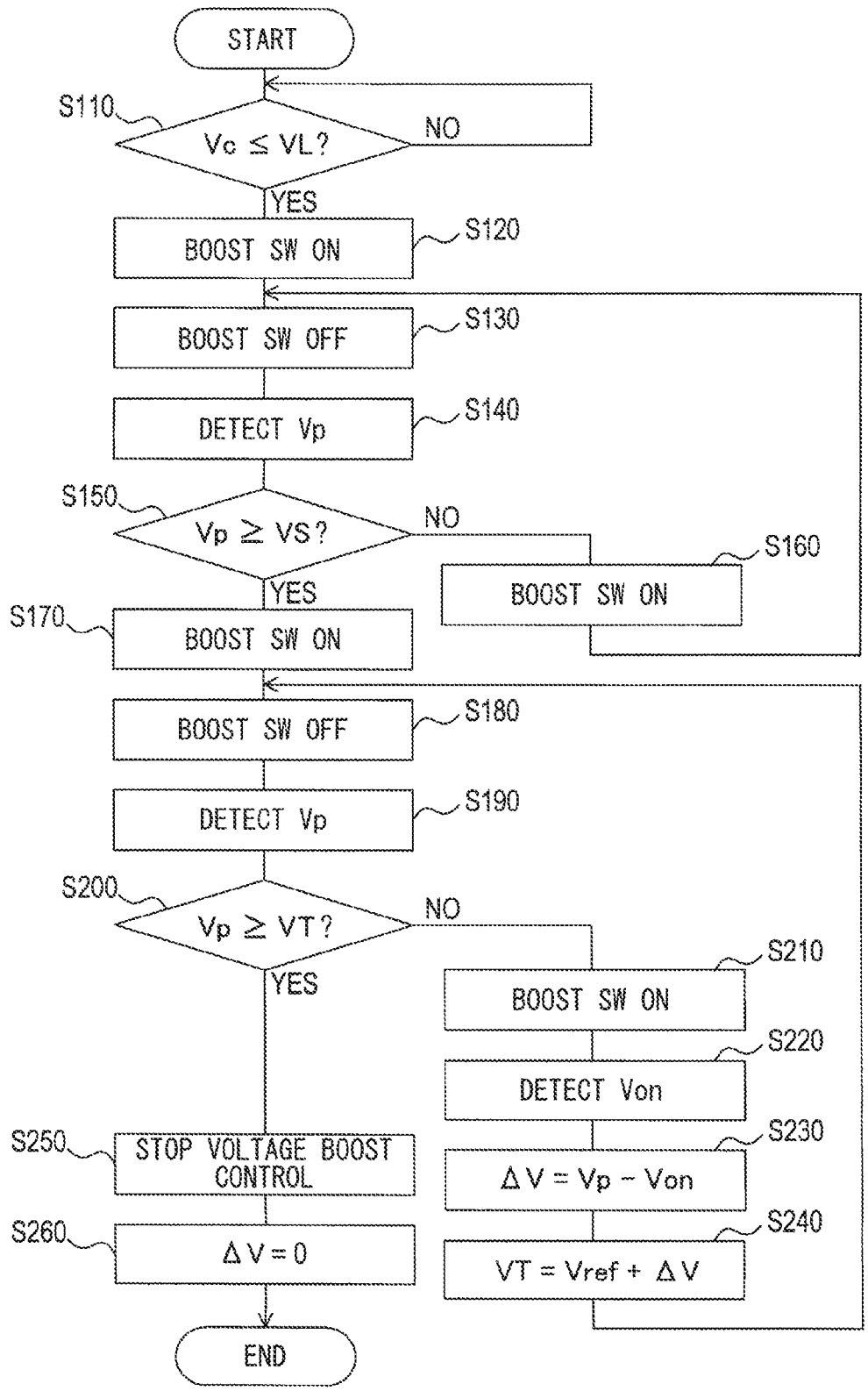
FIG. 2 is a flowchart of a process performed by a control circuit in the first embodiment of the present disclosure.

As shown in FIG. 2, at S110 the control circuit 27, or more specifically the voltage boost controller 32, determines whether the capacitor voltage Vc is equal to or below the above-mentioned voltage boost start threshold VL, and, when it is determined that the capacitor voltage Vc is equal to or below the voltage boost start threshold VL in S110, the process proceeds to S120. The control circuit 27 starts the voltage boost control by proceeding to S120.

At S120, the control circuit 27, more specifically the voltage boost controller 32, controls the voltage boost switch 22 to turn ON.

Subsequently, at S130, the control circuit 27, more specifically the voltage boost controller 32, controls the voltage boost switch 22 to turn from ON to OFF. As described above, the voltage boost switch 22 is turned from ON to OFF when the control circuit 27/controller 32 determines that the voltage boost coil current has reached the turn-OFF threshold value.

At S140, the control circuit 27, more specifically the determiner 36, detects the peak value Vp of the capacitor voltage Vc in the OFF period of the voltage boost switch 22.

At S150 the control circuit 27/determiner 36 determine whether the peak value Up detected in S140 has reached the above-mentioned correction start threshold value VS. The determination of whether the peak value Vp has reached the correction start threshold value VS in S150 means that the control circuit 27/determiner 36 has determined whether the capacitor voltage Vc has reached the correction start threshold value VS.

When the control circuit 27/determiner 36 determines at S150 that the peak value Vp has not reached the correction start threshold value VS, i.e., NO at S150, the process proceeds to S160. At S160, the control circuit 27, more specifically the controller 32, controls the voltage boost switch 22 to turn from OFF to ON, and the process returns to S130. As described above, the voltage boost switch 22 is turned from OFF to ON after a predetermined amount of time elapses from when the voltage boost switch 22 is turned OFF.

On the other hand, at S150, when the control circuit/determiner 36 determines that the peak value Vp has reached the correction start threshold value VS, that is, the capacitor voltage Vc has reached the correction start threshold value VS, i.e., YES at S150, the process proceeds to S170.

At S170, the control circuit 27, more specifically the controller 32, controls the voltage boost switch 22 to turn from OFF to ON.

At S180, the control circuit 27, more specifically the controller 32, controls the voltage boost switch 22 to turn from ON to OFF.

At S190, the control circuit 27, more specifically the corrector 34, detects the peak value Vp of the capacitor voltage Vc in the OFF period of the voltage boost switch 22.

Subsequently at S200, the control circuit 27, more specifically the controller 32, determines whether the peak value Vp detected at S190 has reached the target value VT in the register 35. The determination of whether the peak value Vp has reached the target value VT at S200 means determining whether the capacitor voltage Vc has reached the target value VT.

When the control circuit 27/controller 32 determine at S200 that the peak value Vp has not reached the target value VT, the process proceeds to S210.

At S210, the control circuit 27, more specifically the controller 32, controls the voltage boost switch 22 to turn from OFF to ON.

The switch-ON value Von is the value of the capacitor voltage Vc in the ON period of the voltage boost switch 22. At S220, the control circuit 27, more specifically the corrector 34, detects the switch-ON value Von after a preset amount of time Ts elapses from when the voltage boost switch 22 is turned ON. The preset time Ts is a period shorter than a design minimum value when the voltage boost switch 22 is turned ON. The preset time Ts is also equal to or a longer than a capacitor voltage Vc stabilization time. That is, the time to stabilize the capacitor voltage Vc after turning ON the voltage boost switch 22. As used herein, the switch-ON value Von of the capacitor voltage Vc detected at S220 may also be referred to as an ON-time voltage value.

At S230, the control circuit 27, more specifically the corrector 34, calculates the difference ΔV between the peak value Vp detected at S190 and the ON-time voltage value Von (e.g., switch-ON value) detected at S220 using the following equation 1.

$$\Delta V = Vp - \text{Von} \qquad \text{Equation 1}$$

The value of the difference ΔV calculated at S230 increases as an ESR value of the capacitor 8 increases. Therefore, the value of the difference ΔV corresponds to a physical value that is correlated with the ESR value of the capacitor 8.

At S240, the control circuit 27, more specifically the corrector 34, corrects the target value VT stored in the register 35 by using the difference ΔV calculated in S230.

More specifically, the control circuit 27/corrector 34 calculates the target value VT by using the difference ΔV calculated in S230 by using the following equation 2. Then, the control circuit 27 overwrites the target value VT in the register 35 with the corrected target value VT after making the correction.

$$VT = \text{Vref} + \Delta V \qquad \text{Equation 2}$$

Therefore, the post-correction target value VT is a sum of the difference ΔV and the reference value Vref. The greater the difference ΔV, the greater the ESR value of the capacitor 8. As such, the corrected target value VT may be corrected to be a value greater than the target value VT relative to the reference value Vref.

After the process of S240, the process returns to S180, and the control circuit 27/controller 32 controls the voltage boost switch 22 to turn from ON to OFF.

On the other hand, at S200, when the control circuit 27/controller 32 determines that the peak value Vp detected at S190 has reached the target value VT, that is, when the capacitor voltage Vc has reached the target value VT, i.e., YES at S200, the process proceeds to S250.

At S250, the control circuit 27, more specifically the controller 32, stops the voltage boost control.

At S260, the control circuit 27 resets the difference ΔV to 0, and the process shown in FIG. 2 ends. Due to the stop of the voltage boost control at S250, the voltage boost switch 22 stays in the OFF state. When the process of FIG. 2 ends, the process of FIG. 2 may restart at S110 either immediately after S260, or after a preset amount of time.

1-3. Example Operation

Figure 3:
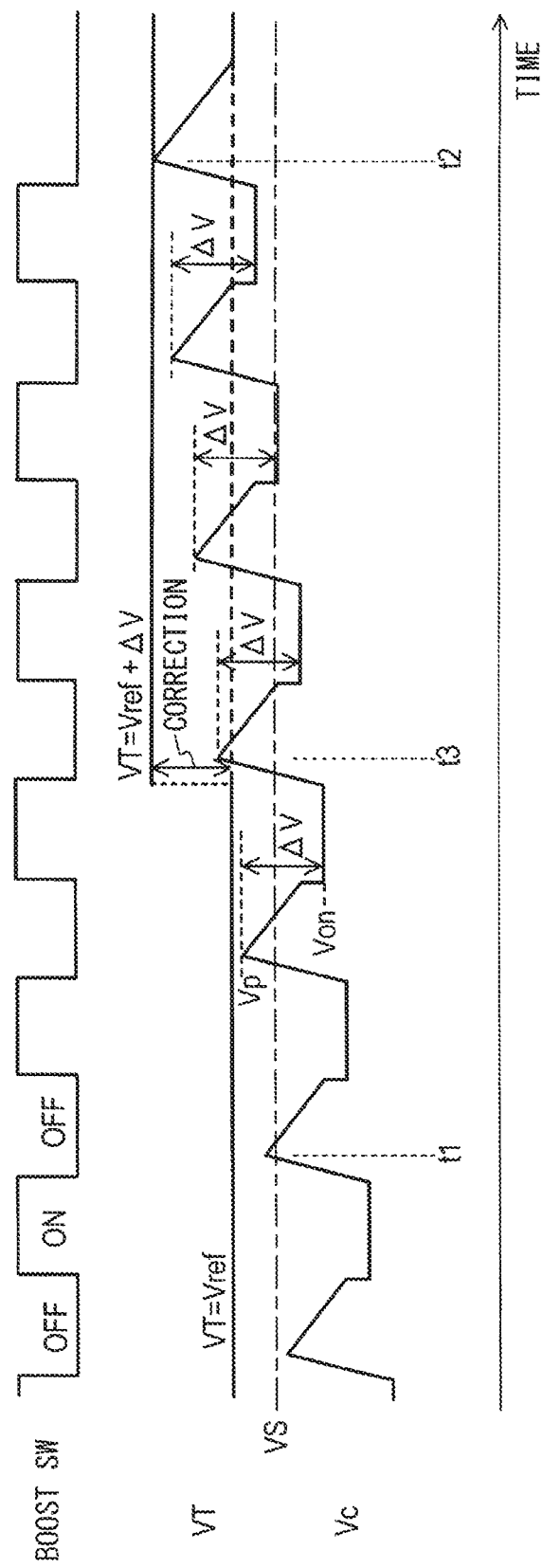
FIG. 3 illustrates an example operation in the first embodiment of the present disclosure.

An example operation of the ON/OFF state of the voltage boost switch 22 including the target value VT, the correction start threshold value VS, and the capacitor voltage Vc is illustrated in FIG. 3.

As shown in FIG. 3, when the capacitor voltage Vc rises by switching the voltage boost switch 22 ON and OFF and exceeds the correction start threshold value VS at time t1, the control circuit 27/determiner 36 determines that the peak value Vp exceeds the threshold value VS, i.e., "YES" at S150 in FIG. 2. After the peak value Vp exceeds the threshold value VS, the control circuit 27/corrector 34 calculates the difference ΔV for every OFF/ON cycle of the voltage boost switch 22 to be used as a basis to calculate the corrected target value VT.

That is, when the voltage boost switch 22 is turned OFF, the peak value Vp of the capacitor voltage Vc is detected by the control circuit 27/corrector 34, as shown at 5S90 in FIG. 2. During the next ON period of the voltage boost switch 22, the control circuit 27/corrector 34 detects the switch-ON value Von of the capacitor voltage Vc, calculates the difference ΔV, as the difference of Vp and Von, and sets the post-correction target value VT as the sum of the difference ΔV and the reference value Vref, as shown at S220-S240 in FIG. 2. In the example of FIG. 3, the difference ΔV is calculated each time as the same value. As such, the post-correction target value VT is a constant value.

At time t2, when the voltage boost switch 22 is turned OFF and the peak value Vp of the capacitor voltage Vc reaches the post-correction target value VT, that is, when the control circuit 27/controller 32 determines that the peak value Vp is equal to or greater than the post-correction target value VT, i.e., "YES" at S200 in FIG. 2, it is determined as "YES" at S200 in FIG. 2, the ON/OFF switching of the voltage boost switch 22 is stopped. That is, when the peak value Vp exceeds the post-correction target value VT, the voltage boost control is stopped. When the voltage boost control is stopped after time t2, the capacitor voltage Vc converges to a stable value that is substantially equal to the reference value Vref, which is the pre-correction target value VT. In instances where the correction of the target value VT is not performed, the voltage boost control may be stopped at an earlier time. That is, for example, where the peak value Vp exceeds the uncorrected target value VT, which is simply the reference value Vref, i.e., "YES at S200 in FIG. 2 and shown at time t3 in FIG. 3, the voltage boost control is stopped after time t3. As shown in FIG. 3, time t3 occurs prior to time t2.

1-4. Effects

According to the first embodiment described in above, the following effects are achievable.

The control circuit 27/corrector 34 detects the physical value correlated with the ESR value of the capacitor 8, and corrects the target value VT to a corrected target value VT that is a greater value relative to the reference value Vref and based on the detected physical value. That is, the control circuit 27/corrector 34 corrects the target value VT to a greater value, as the detected physical value increases to represent a greater ESR value. Therefore, the greater the ESR value of the capacitor 8 and the greater the peak value Vp of the capacitor voltage Vc when the voltage boost switch 22 is turned OFF, the greater the corrected target value VT.

Therefore, inaccuracies caused by the capacitor voltage Vc not yet stably reaching the target value VT can be limited and/or prevented. That is, misrepresentation of the capacitor voltage Vc reaching the target value VT, where in fact, the capacitor voltage Vc has not yet stably reached the target value VT can be limited and/or prevented and the premature switching of the switching element to the OFF state can be limited and/or prevented. Therefore, the accuracy of setting the capacitor voltage Vc to the reference value Vref of the target value VT can be improved, without having to control the switching speed of the voltage boost switch 22.

The control circuit 27/corrector 34 detects, as the physical value correlated with the ESR value, the difference ΔV between (i) the peak value Vp of the capacitor voltage Vc during the OFF period of the voltage boost switch 22 during the voltage boost control, and (ii) the switch-ON value Von of the capacitor voltage Vc in the subsequent ON period of the voltage boost switch 22 during the voltage boost control. As such, the physical value used for correcting the target value VT can be calculated by values that are relatively simple to detect. Since the post-correction target value VT is calculated as the sum of the above-described difference ΔV and the reference value Vref, the stabilized capacitor voltage Vc after stopping the voltage boost control can easily be set as the reference value Vref.

The control circuit 27/corrector 34 detects the switch-ON value Von of the capacitor voltage Vp in the ON period of the voltage boost switch 22 (e.g., the ON-time voltage value Von) as the switch-ON value Von of the capacitor voltage Vc after a preset amount of time Ts has elapsed from when the voltage boost switch 22 is turned ON. As such, the value of the stabilized capacitor voltage Vc is detectable as the ON-time voltage value Von (i.e., the switch-ON value Von).

When determiner 36 determines that the capacitor voltage Vc has reached the correction start threshold value VS, as shown at S150 in FIG. 2, after the voltage boost control has begun, the corrector 34 starts to operate. That is, the correction of the target value VT by the corrector 34 is started at such time. As a result, the processing load for correcting the target value VT is reduced. The correction start threshold value VS is a preset threshold value and may be simply referred to as a threshold value.

2. Second Embodiment

2-1. Difference from the First Embodiment

The configuration of the second embodiment is similar to the configuration of the first embodiment. As such, the following description focuses on the differences between the first and second embodiments. Like elements and features from the first embodiment are referred to in the second embodiment by the same reference character and a repeat description of such elements and features is omitted for brevity.

Figure 4:
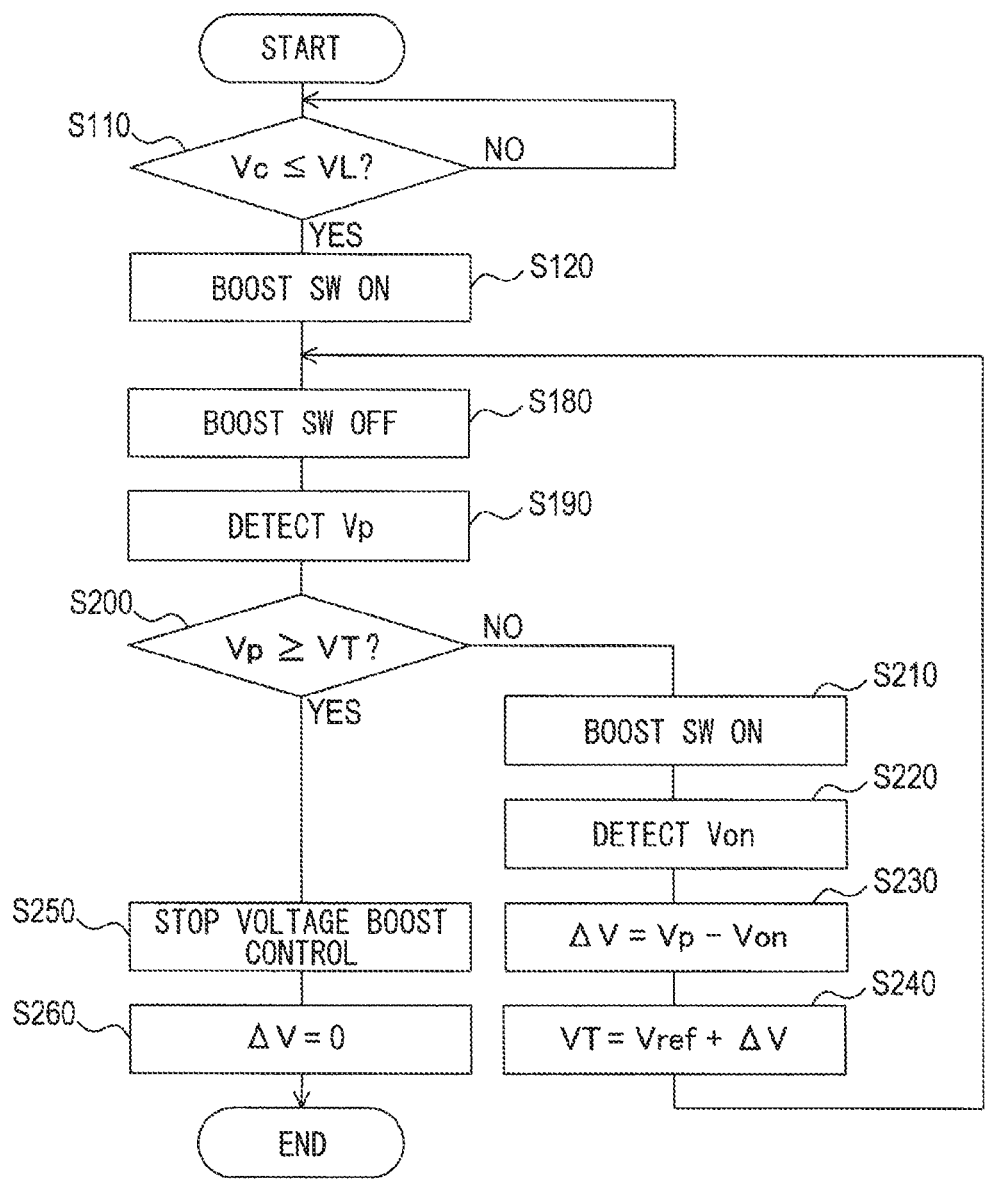
FIG. 4 is a flowchart of a process performed by a control circuit in a second embodiment of the present disclosure.

As for the driver 1 of the second embodiment, the control circuit 27 does not include the determiner 36. As such, the control circuit 27 performs a process shown in FIG. 4, instead of the process shown in FIG. 2. The process in FIG. 4 is different from the process in FIG. 2 in that S130-S170 are not included in the process of FIG. 4. As such, after completing the process at S120, the process proceeds to S180, as shown in FIG. 4.

In the driver 1 of the second embodiment, when the voltage boost control is started, for every OFF to ON switching cycle of the voltage boost switch 22, the processes of S190, S220-S240 are performed by the control circuit 27, or more specifically the corrector 34. As such, the process performed at S190, S220-S240 correspond to the operations performed by the corrector 34. The processes at S110-S180, S200, S210, and S250 may be performed by the control circuit 27, or more specifically the voltage boost controller 32, or simply the "controller" 32. The processes at S190, S220-S240 may be performed by the control circuit 27, or more specifically the corrector 34.

2-2. Example Operation

Figure 5:
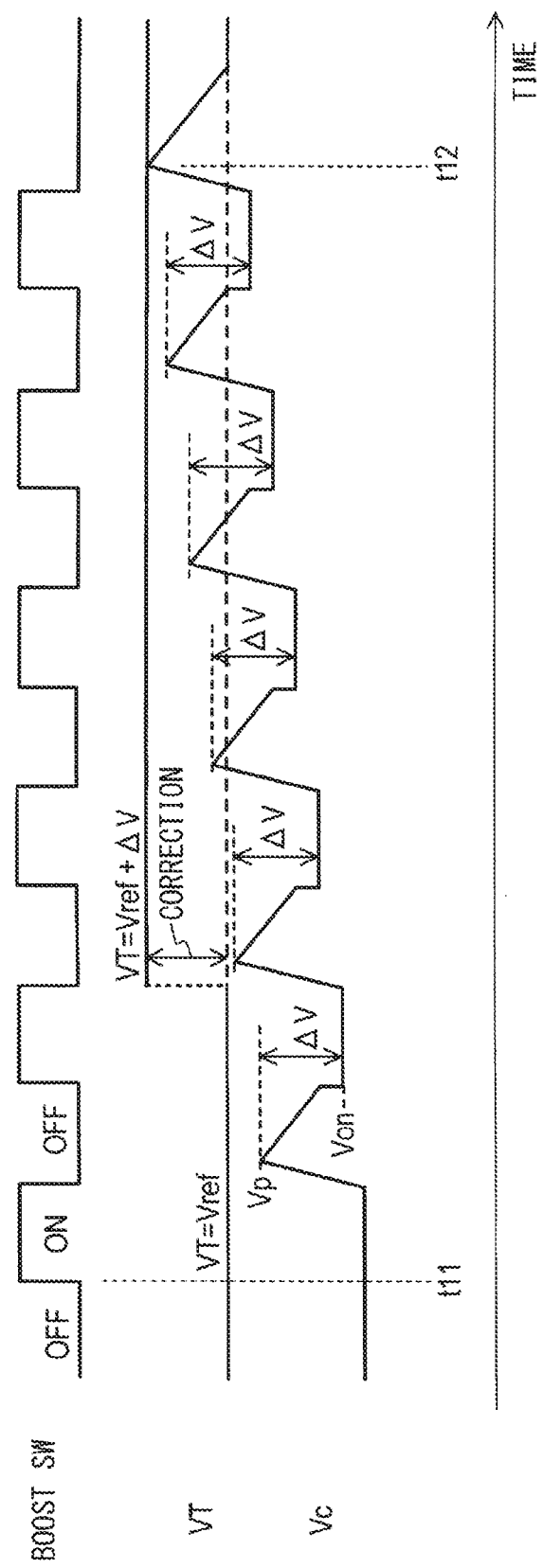
FIG. 5 illustrates an example operation in the second embodiment of the present disclosure.

An example operation of the ON/OFF state of the voltage boost switch 22 including the target value VT and the capacitor voltage Vc is illustrated in FIG. 5. The example operation illustrated in FIG. 5 is similar to the example operation illustrated in FIG. 3.

As shown in FIG. 5, calculating the difference ΔV for use as the basis of the corrected target value VT by the corrector 34 is performed for every OFF to ON switching cycle of the voltage boost switch 22 after the start of the voltage boost control, e.g., "YES" at S110 of FIG. 4, which is determined at time t11 in FIG. 5. In FIG. 5, similar to FIG. 3, the post-correction target value VT is a constant value, because the difference ΔV calculated in every cycle is the same, constant value.

At time t12 in FIG. 5, when the voltage boost switch is switched OFF and the peak value Vp of the capacitor voltage Vc reaches the post-correction target value VT, i.e., "YES" at S200 in FIG. 4, the ON and OFF switching of the voltage boost switch 22 is stopped, that is, the voltage boost control is stopped. When the voltage boost control is stopped, the capacitor voltage Vc converges to a stable value, and such a stable capacitor voltage Vc is substantially equal to the reference value Vref, which is the pre-correction target value VT.

2-3. Effects

The same effects of the first embodiment described above are also achievable by the second embodiment. Additionally, since the calculations for the correction of the target value VT are performed at every switching cycle after the start of the voltage boost control, the accuracy of controlling the capacitor voltage Vc to converge toward the reference value Vref of the target value VT is further improved.

3. Third Embodiment

3-1. Difference from the First Embodiment

The configuration of the third embodiment is similar to the configuration of the first embodiment. As such, the following description focuses on the differences between the first and third embodiments. Like elements and features from the first embodiment are referred to in the third embodiment by the same reference characters and a repeat description of such elements and features is omitted for brevity.

As for the driver 1 of the third embodiment, the control circuit 27 is not provided with the determiner 36, similar to the control circuit 27 of the second embodiment.

Figure 6:
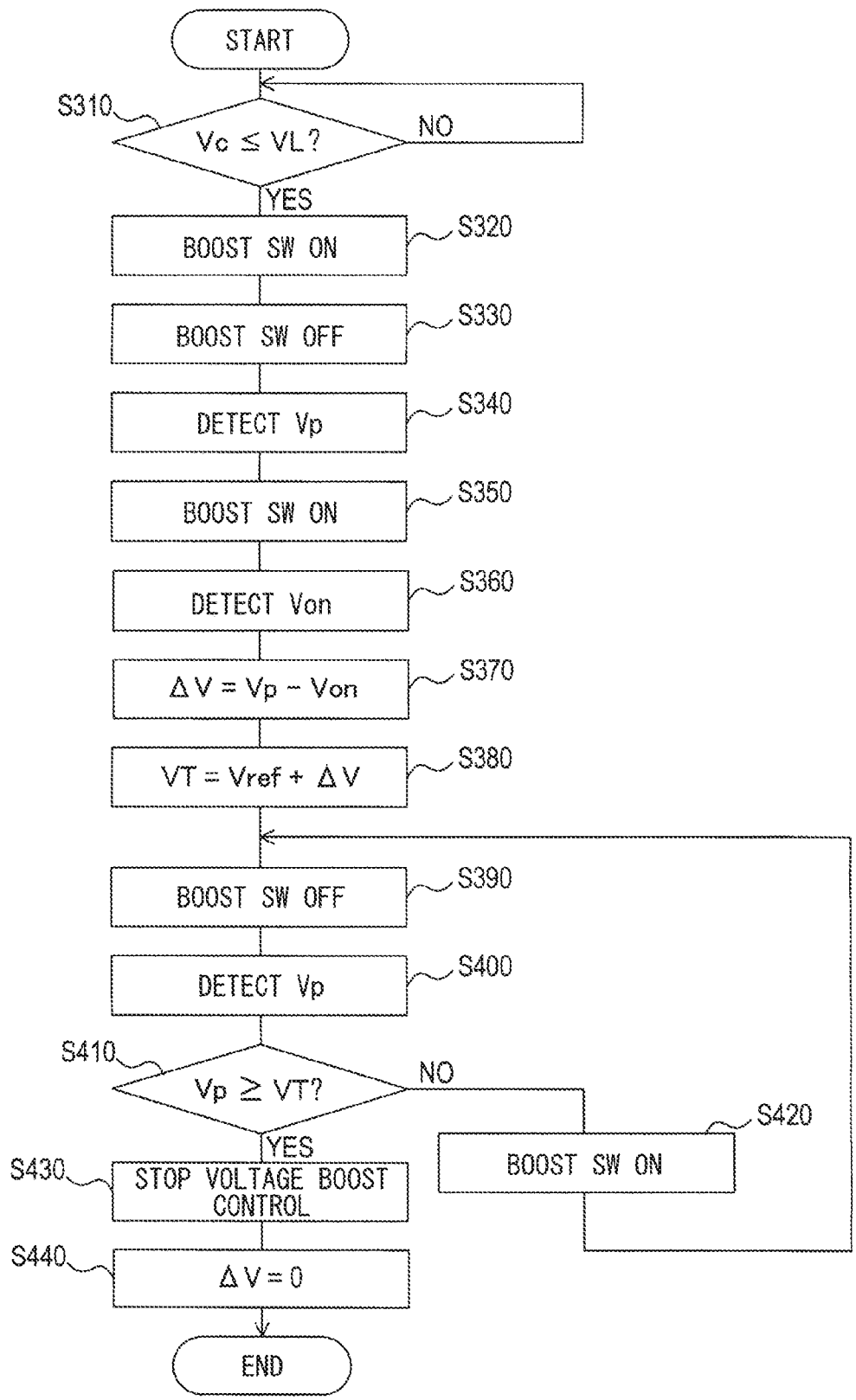
FIG. 6 is a flowchart of a process performed by a control circuit in a third embodiment of the present disclosure.

As such, the control circuit 27 performs the process shown in FIG. 6, instead of the process shown in FIG. 2.

3-2. Processing

The processes at S310-S330 in FIG. 6 are the same as the processes at S110-S130 in FIG. 2. The processes at S390-S430 in FIG. 6 are the same as the processes at S180-S210 and S250 in FIG. 2.

As shown in FIG. 6, at S310 the control circuit 27, more specifically the voltage boost controller 32 or simply the controller 32, determines whether the capacitor voltage Vc is equal to or below the above-mentioned voltage boost start threshold VL. When the control circuit 27/controller 32 determines that the capacitor voltage Vc is equal to or below the voltage boost start threshold VL in S310, the process proceeds to S320 and the control circuit 27/controller 32 begins the voltage boost control.

At S320, the control circuit 27/controller 32 controls the voltage boost switch 22 to turn ON.

At S330, the control circuit 27/controller 32 controls the voltage boost switch 22 to turn from ON to OFF.

At S340, the control circuit 27, or more specifically the corrector 34, detects the peak value Vp of the capacitor voltage Vc during the OFF period of the voltage boost switch 22.

At S350, the control circuit 27/controller 32 controls the voltage boost switch 22 to turn from OFF to ON.

Then, at S360, similar to S220 in FIG. 2, the control circuit 27/corrector 34 detects the switch-ON value Von of the capacitor voltage Vc after a preset amount of time Ts elapses after turning the voltage boost switch 22 to ON. That is, the control circuit 27/corrector 34 detects the switch-ON value Von of the capacitor voltage Vc during the ON period of the voltage boost switch 22.

At S370, the control circuit 27/corrector 34 calculates the difference ΔV between the peak value Vp detected in S340 and the switch-ON value Von detected in S360 by using the above-described equation 1.

At S380, the control circuit 27/corrector 34 calculates the post-correction target value VT by using the difference ΔV calculated in S370 in the above-described equation 2. Then, the control circuit 27/corrector 34 overwrites the target value VT in the register 35 with the calculated, post-correction target value VT.

After performing S380, the process proceeds to S390 and the control circuit 27/controller 32 controls the voltage boost switch 22 turn from ON to OFF.

At S400, the control circuit 27/controller 32 detects the peak value Vp of the capacitor voltage Vc in the OFF period of the voltage boost switch 22.

At S410, the control circuit 27/controller 32 determines whether the peak value Vp detected in S400 has reached the corrected target value VT stored in the register 35.

At S410, when the control circuit 27/controller 32 determines that the peak value Vp has not reached the target value VT, i.e., "NO" at S410, the process proceeds to S420. At S420 the control circuit 27/controller 32 controls the voltage boost switch 22 to turn from OFF to ON, and then the process returns to S390.

At S410, when the control circuit 27/controller 32 determines that the peak value Vp has reached the corrected target value VT, that is, the capacitor voltage Vc has reached the corrected target value VT, i.e., "YES" at S410, the process proceeds to S430 and the voltage boost control stops. At S440, the control circuit 27 resets the difference ΔV to 0 and the process shown in FIG. 6 ends. After the process of FIG. 6 ends, the process may either restart at S310 either immediately after S440, or after a preset time, similar to the process of FIG. 2.

3-3. Example Operation

Figure 7:
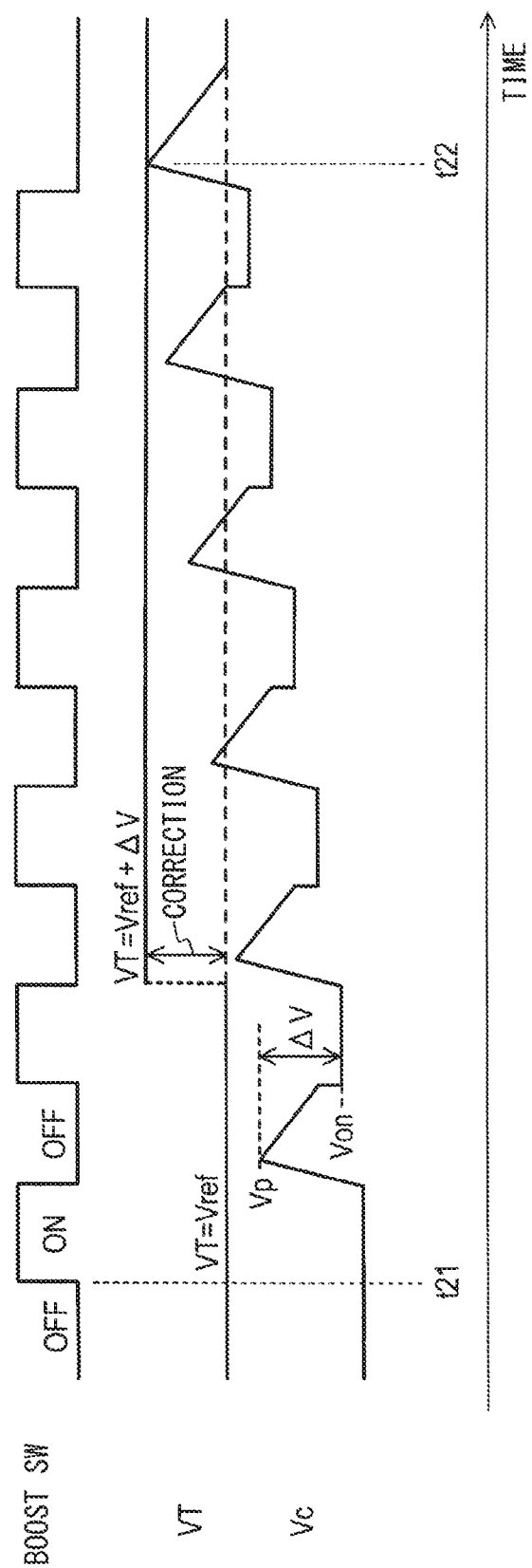
FIG. 7 illustrates an example operation in the third embodiment of the present disclosure.

An example operation of the ON/OFF state of the voltage boost switch 22 including the target value VT and the capacitor voltage Vc is shown in FIG. 7, and is similar to the example operations shown in FIG. 3 and FIG. 5.

As shown in FIG. 7, when a "YES" determination is made at S310 in FIG. 6 the voltage boost control is started, shown at time t21 in FIG. 7. During the voltage boost control, the voltage boost switch 22 is first switched ON, shown at S320 in FIG. 6.

When the voltage boost switch 22 is first switched OFF during the voltage boost control, i.e., at S330 in FIG. 6, the peak value Vp of the capacitor voltage Vp is detected during the first OFF period of the voltage boost switch 22, i.e., at S340 in FIG. 6.

Then, when the voltage boost switch 22 is subsequently turned ON after the first OFF period, e.g., when the voltage boost switch 22 is turned ON the second time, the switch-ON value Von of the capacitor voltage Vc in the ON period of the voltage boost switch 22 is detected, as shown in S350 and S360 of FIG. 6.

When the voltage boost switch 22 is next turned OFF, the difference ΔV between Vp and Von is calculated, as shown at S370 and S380 in FIG. 6. The sum of the difference ΔV and the reference value Vref is set as the post-correction target value VT.

Until a "YES" determination is made at S410 in FIG. 6, that is, until the control circuit 27/controller 32 determines that the capacitor voltage Vc reaches the post-correction target value VT, the control circuit 27/controller 32 continues to repeat the ON/OFF switching of the voltage boost switch 22, as shown in S390 and S420 of FIG. 6.

Then, at time t22 in FIG. 6, when the voltage boost switch is switched OFF and the peak value Vp of the capacitor voltage Vc reaches the post-correction target value VT, i.e., "YES" at S410 in FIG. 6, the ON/OFF switching of the voltage boost switch 22 is stopped. That is, the voltage boost control is stopped. After the voltage boost control is stopped, the capacitor voltage Vc converges to a stable value, and the stable capacitor voltage Vc is substantially equal to the reference value Vref, which is the pre-correction target value VT.

3-4. Effects

The same effects of the first embodiment described above may also be achieved by the third embodiment. Further, the processing at S340, S360-S380 performed by the control circuit 27/corrector 34 is performed one time after the beginning of the voltage boost control. More practically, after the start of the voltage boost control, in one ON/OFF switching cycle of the voltage boost switch, the processing performed by the control circuit 27/corrector 34 at S340, S360-S380 is performed. That is, the control circuit 27/corrector 34 performs the calculations for the correction of the target value VT only once at the beginning of the voltage boost control. In such manner, the processing load for correcting the target value VT can be reduced.

4. Other Embodiments

Although the embodiments of the present disclosure are described in the above paragraphs, embodiments other than the above may also be considered for modifying the present disclosure.

For example, the inclination/slope at which the capacitor voltage Vc increases during the ON/OFF switching of voltage boost switch 22 may also be detected as a physical value and correlated with the ESR value of the capacitor 8. In such case, the greater the ESR value, the greater the slope of the detected capacitor voltage Vc. Therefore, when a greater value of the slope is detected, the target value VT may be corrected to a corrected target value VT that is a greater value relative to the reference value Vref.

In each of the above-described embodiments, the difference ΔV for correcting the target value VT may be a difference between (i) a value of the capacitor voltage Vc during the ON period of the voltage boost switch 22, and (ii) a peak value of the capacitor voltage Vc in the subsequent OFF period of the voltage boost switch 22.

To calculate the post-correction target value VT, the sum of the difference ΔV and the reference value Vref may be calculated after multiplying the difference ΔV by a certain constant or after adding a certain constant to the difference ΔV.

In the above embodiments, one function may be performed by one component or by several components, and several functions may be performed by one component or by several components. A part of an embodiment may be omitted, and a part of one embodiment may be added to another embodiment and/or may be replaced with a part of another embodiment.

In addition to the driver 1 described above, a system having such a driver 1, a program for operating a computer/processor to serve as the driver 1, a memory medium storing such a program, a control method of a booster circuit implemented by the driver 1, and the like, may also be embodied as a variation of the present disclosure.

Although the present disclosure has been fully described in connection with embodiments thereof with reference to the accompanying drawings, it is to be noted that various changes and modifications become apparent to those skilled in the art, and such changes, modifications, and summarized schemes are to be understood as being within the scope of the present disclosure as defined by the appended claims.

What is claimed is:

1. An injector driving device comprising:
    a booster circuit to drive an injector, the booster circuit including:
        a coil having a first end and a second end, a power source voltage supplied to the coil via the first end;
        a switching element having a first output terminal and a second output terminal, the first and second output terminals of the switching element connected in series between the second end of the coil and a reference potential that is lower than the power source voltage, where the first output terminal of the switching element is connected to the second end of the coil and the second output terminal of the switching element is connected to the reference potential;
        a diode having an anode and a cathode, the anode of the diode connected between the second end of the coil and the first output terminal of the switching element; and
        a capacitor having a positive terminal and a negative terminal, the capacitor connected in series between the cathode of the diode and the reference potential, where the positive terminal of the capacitor is connected to the cathode of the diode and the negative terminal of the capacitor is connected to the reference potential;
    a controller (i) configured to perform a voltage boost control to charge the capacitor by repeatedly switching the switching element ON and OFF to cause a reverse voltage in the coil, and (ii) further configured to stop the voltage boost control upon determining that a capacitor voltage at the positive terminal of the capacitor has reached a corrected target value that is greater than the power source voltage; and
    a corrector configured to detect a physical value that is correlated with an equivalent-series-resistance (ESR) value of the capacitor, and to correct the target value to the corrected target value that is a greater value when the detected physical value increases.

2. The injector driving device of claim 1, wherein the corrector is further configured to detect, as the physical value, a difference between (i) a peak value of the capacitor voltage when the switching element is switched OFF during the voltage boost control, and (ii) a switch-ON value of the capacitor voltage when the switching element is switched ON during the voltage boost control.

3. The injector driving device of claim 2, wherein the corrector is further configured to detect, the capacitor voltage, as the switch-ON value, after a preset amount of time has elapsed after the switching element is turned ON.

4. The injector driving device of claim 1 further comprising:
    a determiner configured to determine whether the capacitor voltage has reached a preset threshold value that is greater than the power source voltage and is smaller than the target value not yet corrected by the corrector after the voltage boost control begins, wherein
    the corrector is configured to operate after the determiner determines that the capacitor voltage has reached the threshold value.

5. The injector driving device of claim 2, wherein the corrector is configured to operate once every OFF/ON switching cycle of the switching element during the voltage boost control.

6. The injector driving device of claim 2, wherein the corrector is configured to operate only once when the voltage boost control begins.

* * * * *